United States Patent
Laden et al.

(10) Patent No.: US 10,547,499 B2
(45) Date of Patent: Jan. 28, 2020

(54) SOFTWARE DEFINED FAILURE DETECTION OF MANY NODES

(71) Applicant: International Business Machines Corporation, Armonk, NY (US)

(72) Inventors: Guy Laden, Jaffa (IL); Yacov Manevich, Beer Sheva (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/694,866

(22) Filed: Sep. 4, 2017

(65) Prior Publication Data
US 2019/0075017 A1   Mar. 7, 2019

(51) Int. Cl.
*H04W 72/04* (2009.01)
*H04L 12/24* (2006.01)
*H04L 29/08* (2006.01)

(52) U.S. Cl.
CPC ........ *H04L 41/0677* (2013.01); *H04L 41/12* (2013.01); *H04L 67/10* (2013.01)

(58) Field of Classification Search
CPC ...... H04L 41/0677; H04L 41/12; H04L 67/10
See application file for complete search history.

(56) References Cited

U.S. PATENT DOCUMENTS

| 7,287,180 B1 * | 10/2007 | Chen ............... G06F 11/2033 714/11 |
| 9,385,917 B1 | 7/2016 | Khanna et al. |
| 2015/0304158 A1 | 10/2015 | Dharmadhikari et al. |
| 2018/0097845 A1 * | 4/2018 | Chen ................ H04L 41/12 |

FOREIGN PATENT DOCUMENTS

WO   2016192408   12/2016

OTHER PUBLICATIONS

Veron et al., "RepFD—Using Reputation Systems to Detect Failures in Large Dynamic Networks", 2015 44th International Conference on Parallel Processing, Sep. 2015, pp. 91-100.

(Continued)

*Primary Examiner* — Hassan Kizou
*Assistant Examiner* — Mahbubul Bar Chowdhury
(74) *Attorney, Agent, or Firm* — Gregory J. Kirsch

(57) ABSTRACT

Embodiments of the present systems and methods may provide the capability to monitor and detect failure of nodes in a data center environment by using a software defined failure detector that can be adjusted to varying conditions and data center topology. In an embodiment, a computer-implemented method for monitoring and detecting failure of electronic systems may comprise, in a system comprising a plurality of networked computer systems, defining at least one failure detection agent to monitor operation of other failure detection agents running on at least some of the electronic systems, and defining, at the controller, and transmitting, from the controller, topology information defining a topology of the failure detection agents to the failure detection agents, wherein the topology information includes information defining which failure detection agents each failure detection agent is to monitor.

20 Claims, 5 Drawing Sheets

(56) References Cited

OTHER PUBLICATIONS

IBM Tivoli Monitoring, IBM Tivoli, Version 6.3. https://www.ibm.com/support/knowledgecenter/SSTFXA_6.3.0/com.ibm.itm.doc_6.3/install/itm_over.htm (retrieved Sep. 12, 2017).
Hunt et al., "ZooKeeper: Wait-free coordination for Internet-scale systems", USENIXATC'10 Proceedings of the 2010 USENIX conference on USENIX annual technical conference, Jun. 2010.
Serf, HashiCorp, 2013. Available at: https://www.serf.io/.
Consul, HashiCorp, 2013. Available at: https://www.consul.io/
Renesse et al., "A Gossip-Style Failure Detection Service", IFIP International Conference on Distributed Systems Platforms and Open Distributed Processing, Sep. 1998, pp. 55-70.
Melamed et al., "Araneola: A Scalable Reliable Multicast System for Dynamic Environments", Third IEEE International Symposium on Network Computing and Applications, 2004, pp. 5-14.
Gupta et al., "On Scalable and Efficient Distributed Failure Detectors", Twentieth ACM Symposium on Principles of Distributed Computing, Aug. 2001, pp. 170-179.
Zhuang et al., "On Failure Detection Algorithms in Overlay Networks", IEEE 24th Annual Joint Conference of the IEEE Computer and Communications Societies, Mar. 2005, pp. 2112-2123, vol. 3.
Chandra et al., "Unreliable Failure Detectors for Reliable Distributed Systems", Journal of the ACM, Mar. 1996, pp. 225-267, vol. 43, Issue 2.
Chen et al., "On the Quality of Service of Failure Detectors", IEEE Transactions on Computers, 2002, pp. 13-32, vol. 51, Issue 1.
Zhang et al., "CubicRing: Enabling One-Hop Failure Detection and Recovery for Distributed In-Memory Storage Systems", the 12th USENIX Conference on Networked Systems Design and Implementation, May 2015, pp. 529-542.
Birman, "A review of experiences with reliable multicast", Software—Practice & Experience, Jul. 25, 1999, pp. 741-774, vol. 29 Issue 9.
Hoffman, "Cluster Monitoring with Ganglia", Linux Magazine, Aug. 15, 2003. Available at: http://www.linux-mag.com/id/1433/.
Tock et al., "Design and Implementation of a Scalable Membership Service for Supercomputer Resiliency-Aware Runtime", European Conference on Parallel Processing, Aug. 2013, pp. 354-366.
Guo et al., "Pingmesh: A Large-Scale System for Data Center Network Latency Measurement and Analysis", ACM Conference on Special Interest Group on Data Communication, Aug. 2015, pp. 139-152.

\* cited by examiner

SOFTWARE DEFINED FAILURE DETECTION OF MANY NODES

BACKGROUND

The present invention relates to methods and systems for monitoring and detecting failure of nodes in a data center environment by using a software defined failure detector that can be adjusted to varying conditions and data center topology.

Modern data centers typically contain large numbers of computer systems organized and connected using a number of interconnected networks. In turn, each computer system may implement containers, virtual machines, and processes. Monitoring and detecting failures of such large numbers of processes, containers, virtual machines, or physical computers is a necessary component of any distributed and/or fault-tolerant system. A monitoring system for data centers is required to continuously monitor all machines in the datacenter and to quickly and accurately identify failures.

Performance requirements for failure detection include factors such as the speed of detection (how fast is a failure detected and reported), the accuracy of detection (minimal false positives, the ability to detect complex failures like partial network failures, etc.), and scalability (how many nodes can be monitored, and what is involved in increasing or decreasing the number of nodes monitored.) There are many conventional solutions for failure detection and monitoring for large clusters of hardware and software objects. For example, many conventional approaches require that the system topology is fixed and coded into the implementation. Once deployed the topology cannot be easily changed. Many conventional solutions are also targeted at a setting where the network is quite flat; that is, monitoring a node on a single local area network (LAN) or network interface controller (NIC). In modern data centers a node maybe connected to many networks (for example: Ethernet on separate LANs, a torus, wireless, etc.). The fact that one route to a node is down does not mean that the node itself, or all routes to the node are down. However, mapping the monitoring topology to the underlying structure is difficult because every deployment is different.

Accordingly, a need arises for techniques for flexible, scalable monitoring of nodes and networks that can be adjusted to varying conditions and data center topology.

SUMMARY

Embodiments of the present systems and methods may provide the capability to monitor and detect failure of nodes in a data center environment by using a software defined failure detector that can be adjusted to varying conditions and data center topology. For example, the monitoring topology of nodes in a data center may be defined and controlled using a scalable central controller. The scalable controller may compute a graph for monitoring relations between monitoring agents and may inform monitoring agents about what other monitoring agents should be monitored.

In an embodiment, a computer-implemented method for monitoring and detecting failure of electronic systems may comprise, in a system comprising a plurality of networked computer systems, defining at least one failure detection agent to monitor operation of other failure detection agents running on at least some of the electronic systems, and defining, at the controller, and transmitting, from the controller, topology information defining a topology of the failure detection agents to the failure detection agents, wherein the topology information includes information defining which failure detection agents each failure detection agent is to monitor.

In embodiments, each failure detection agent may be configured to communicate failure information to at least a controller, to at least one other failure detection agent, or both. The topology information may further include information defining which failure detection agents each failure detection agent is to notify when a failure is detected or suspected. The topology information may further include information defining the topology information that is to be propagated among the failure detection agents. The controller may be configured to receive a notification of a suspected failure and determine whether the suspected failure is an actual failure. At least one failure detection agent may be configured to receive a notification of a suspected failure, and determine whether the suspected failure is an actual failure. The method may further comprise modifying, at the controller, the topology information based on changes in conditions notified to the controller from at least one failure detection agent during operation of the electronic systems.

In an embodiment, a system for monitoring and detecting failure of electronic systems may comprise at least one controller, implemented in a computer system comprising a processor, memory accessible by the processor, and computer program instructions stored in the memory and executable by the processor, the controller configured to define and transmit, to a plurality of failure detection agents, topology information defining a topology of the failure detection agents, wherein the topology information includes information defining which failure detection agents each failure detection agent is to monitor, and a plurality of failure detection agents, each failure detection agent implemented in a computer system comprising a processor, memory accessible by the processor, and computer program instructions stored in the memory and executable by the processor, each failure detection agent configured to receive the topology information from the at least one controller and to monitor operation of other failure detection agents based on the received the topology information.

In an embodiment, a computer program product for monitoring and detecting failure of electronic systems may comprise a non-transitory computer readable storage having program instructions embodied therewith, the program instructions executable by a computer, to cause the computer to perform a method comprising in a system comprising a plurality of networked computer systems, defining at least one failure detection agent to monitor operation of other failure detection agents running on at least some of the electronic systems; and defining, at the controller, and transmitting, from the controller, topology information defining a topology of the failure detection agents to the failure detection agents, wherein the topology information includes information defining which failure detection agents each failure detection agent is to monitor.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
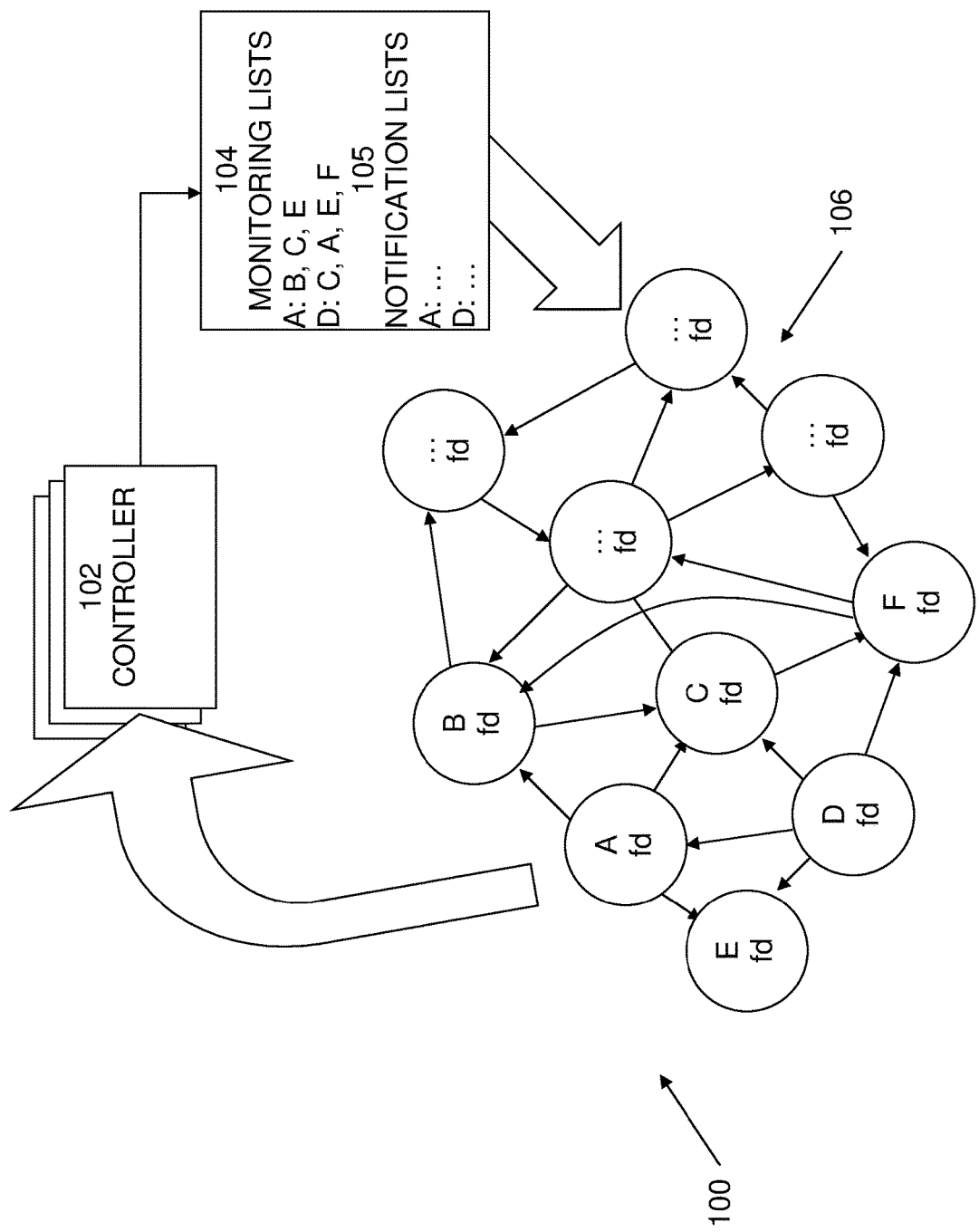
FIG. 1 illustrates an exemplary system in which described embodiments may be implemented.

Embodiments of the present systems and methods may provide the capability to monitor and detect failure of nodes in a data center environment by using a software defined failure detector that can be adjusted to varying conditions and data center topology. For example, the monitoring topology of nodes in a data center may be defined and controlled using a scalable central controller. The scalable controller may compute a graph for monitoring relations between monitoring topologies and may inform monitoring topologies about what other monitoring topologies should be monitored.

In embodiments, a scalable failure detection system may include two types of logical entities: a controller and failure detection (fd)-agents. Fd-agents may be deployed to the entities that are to actively perform monitoring tasks and typically they may also be deployed to the entities to be monitored. The controller component may compute the graph of monitoring relations between fd-agents, also known as the monitoring topology, and may tell an fd-agent what set of other fd-agents it should monitor. The graph may be dynamic and may change as entities are added, removed, or fail. When an agent detects a failure it may notify the controller of this event. The notification may be propagated along any path of agents to the controller and the failure-notification topology may also be determined by the controller and communicated to agents together with the monitoring relations topology. Communicating these topologies to agents may be done over an information-propagation topology which the controller may determine as well. The system may provide scalability for the actual monitoring since it is performed by the many fd-agents, and assuming failures are relatively rare, the controller will not be a bottleneck. The agents may be relatively simple and may consume little resources, while the controller may be more complex and may use more resources. The architecture may facilitate flexible monitoring topologies which can be tuned to adapt to different requirements, such as accuracy vs. overhead. In addition, the architecture may adapt at runtime depending on conditions that arise, for example, an often faulty node should not monitor other nodes.

In embodiments, failure-detection techniques for continuously monitoring a potentially large set of entities may provide the capability to detect and notify about failures that may occur in the set of entities. Advantages of such techniques may include timeliness of detection and reporting of failures, accuracy of detection of normal operation and failures, reduction of resource consumed, and scalability. In order to provide accuracy, the failure-detection techniques should determine if a node is operational or non-operational in a timely manner. In addition, to the extent possible, the system should discriminate node failures from network issues or overloaded servers, etc. The goal is to minimize both false positives and false negatives. The resources consumed may be reduced in terms of factors such as network messages, load on servers, etc. Likewise, the failure-detection techniques may provide the capability to scale to large numbers of monitored nodes.

An exemplary block diagram of an environment 100 in which embodiments of failure-detection techniques may be implemented is shown in FIG. 1. Included in environment 100 may be controller 102, monitoring lists 104, and a plurality of fd-agents 106. Controller 102 is the entity (or plurality of entities) that is aware of all fd-agents 106 in the system and that determines which fd-agent will monitor which other fd-agent, which forms the monitoring topology. The fd-agents 106 are entities that monitor one or more entities (not shown) that are being monitored, as well as monitoring other fd-agents 106 according to the monitoring topology determined by the controller 102. In the case that the monitored entities are servers, fd-agents 106 may be deployed onto all servers to be monitored. The controller may send each fd-agent a list 104 of the nodes it is to monitor, as well as other instructions.

In embodiments, the monitoring topology may be dynamic. In embodiments, controller 102 may update the monitoring topology (and thus the monitoring lists 104) as the set of fd-agents 106 changes, such as when new fd-agents 106 join, fd-agents 106 fail, etc. For example, in the example shown in FIG. 1, fd-agent A monitors fd-agents B, C, and E. If fd-agent A fails, controller 102 may determine one or more alternate monitors for each of B, C, and E. Once determined, controller 102 may propagate these changes to the relevant fd-agents. Accordingly, any fd-agents for which there are changes to its list 104 of fd-agents to monitor may be contacted and sent its new list 104.

Other aspects of the monitoring topology that may be sent to the fd-agents 106 may include parameters that specify the type of failure detection method to be used, parameters to the algorithm, such as heartbeat frequency, etc. It is to be noted that the present techniques are applicable to any failure detection method that may be used, as well as to any particular values or set of values of parameters that may be used by the failure detection methods.

In addition to defining the monitoring topology, controller 102 may specify the failure notification topology. For example, each fd-agent may receive, in addition to the list of fd-agents 104 it is to monitor, a list of fd-agents 105 to send failure notifications to. For example, a simple failure-notification topology may be that all fd-agents 106 report failures to a single fd-agent, such as controller 102 itself. More generally, when an fd-agent detects a failure or receives a failure notification from another fd-agent, it may propagate the failure notification upwards according to the defined topology. An fd-agent may also attempt to filter some of the notifications it receives. For example, to avoid propagating false suspicions, an fd-agent may perform suspicion resolution. One example of a failure detection topology is a tree rooted at the controller. In practice, for various reasons, such as fault tolerance, this topology may not be a simple tree.

Another topology, not shown in FIG. 1, is the topology used for propagating instructions to the fd-agents, for example, the lists of fd-agents to monitor 104 and the lists of destinations for failure notifications 105. For example, the topology used for propagating instructions may be simply from the controller to each fd-agent, however this may be generalized to an arbitrary 'information propagation' topology rooted at the controller.

In embodiments, these three topologies, the monitoring, failure notification and information propagation topologies, may be independent of each other. However, in embodiments, these topologies may have some relation to each other. For example, in order to enable suspicion resolution to be done by fd-agents other than the controller, failure notifications for an fd-agent X (from all monitors of X) may all sent to the same fd-agent Y. This may provide benefits as this may help Y to resolve suspicions locally. In addition, in order for fd-agent Y to be aware of all the monitors of fd-agent X, it may make sense that it is the fd-agent that propagates to all the monitors of X their lists of fd-agents to monitor. Thus in this example, the three topologies are related to each other.

Together, the three topologies may provide the system with the flexibility to adapt to many different system goals and constraints, as well as to runtime conditions that arise, while keeping a simple deployment model consisting of fd-agents and a controller. Examples include: a) the ability to relatively easily evolve the topology over time as the system evolves; b) the ability to trade off accuracy/detection-timeliness for load (CPU/network), both at deployment time and at runtime based on changing conditions (network congestion, fd-agent failure frequency, etc.).

In an embodiment that may be implemented, for example, within a cloud provider, the fd-agents may run on physical computer systems while the controller may run in a virtual machine or a plurality of virtual machines. The fd-agents may be small and simple and meant to consume little resources. The controller may hold more state information and may consume more resources. The actual failure detection may be performed by the fd-agents, which are not subject to virtualized network issues, such as long tail, jitter, etc.

Figure 2:
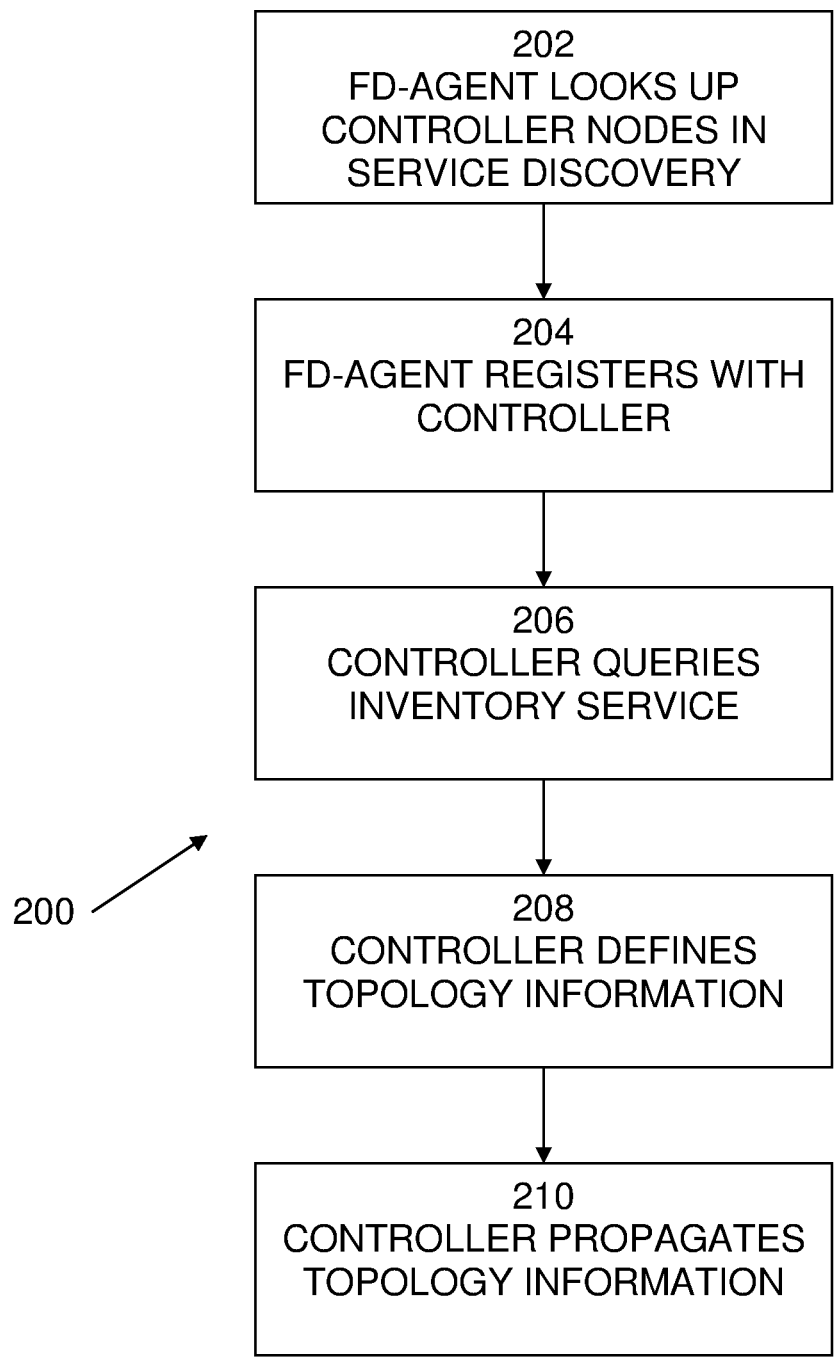
FIG. 2 illustrates an exemplary flow diagram of processes that may implement the described embodiments.

An example of an embodiment of a failure detection operation including fd-agent startup flow 200 is shown in FIG. 2. When an fd-agent starts up it must register with the controller 102. At 202, the fd-agent may look up the controller nodes in service discovery, which may provide the capability for automatic detection of devices, and services offered by these devices, on a computer network. At 204, based on the lookup results from service discovery, the fd-agent perform registration with the controller 102. In addition to registration, at 206, controller 102 may find out about fd-agent 106 that should be monitored by querying an inventory service listing all the fd-agents in the system.

At 208, controller 102 may define network topology information. For example, controller 102 may determine the network topology, that is, which fd-agents will monitor which fd-agents. This produces a graph between the fd-agents which may be termed the monitoring topology. In addition, the controller may specify the policy used by the monitoring relation, such as the frequency of probes or the type of failure-detection method used.

At 210, controller 102, directly or via fd-agents, may propagate the defined topology information, for example, in the form of monitoring lists 104 and notification lists 105.

In embodiments, topology "quality" metrics may be used to determine topologies to be used. Examples of aspects of topology quality metrics may include those listed below:

Irreflexive—an fd-agent must not monitor itself.

Completeness—are all fd-agents monitored at all times or may an fd-agent not be monitored, at all or for a significant time span.

Load imposed by the topology—the number of monitoring messages induced by a topology. For example, a topology may specify N monitors for an fd-agent, which will impose more load than a topology specifying one monitor. To counteract the additional monitors, the rate at which messages are sent may be adapted as a function of the number of monitors. Likewise, the load placed on common network links Load Balance—is the monitoring load balanced across different nodes and network links? For example, some topologies, such as hierarchical topologies, have by design 'hotspot' fd-agents, Facilitate accuracy—a single monitor is susceptible to false suspicions due, for example, to load on the monitor or network issues. With multiple monitors the system is more able to weed out the false suspicions. Monitoring between fd-agents which are 'close' to each other in the physical network topology reduces the probability that a network failure will cause false positives. For example, if fd-agent B is unreachable from fd-agent A, and they are 'close' to each other, then the chance that B is unreachable due to a network issue is smaller. Similarly, if an fd-agent is reported 'down' but a peer close to it is reported 'up' then the likelihood is that the problem is not the network.

Speed of detection—for example, fd-agents that are close to each other in the network can be assumed to have more reliable networking between them and so more frequent pings/heartbeats may be used. Also, the cost of such monitoring may be lower. Likewise, fault-tolerance may be improved since in some topologies it is more likely that there are windows of time where fd-agents may not be monitored. For example, an fd-agent's monitor may have failed and there is no other fd-agent monitoring the fd-agent.

Fault Tolerance—on failure of an fd-agent, the monitoring of the fd-agents it was monitoring is lost, until the controller detects and recovers by assigning new monitors to those fd-agents. Redundancy in the monitoring topology may be part of the solution to this. For example, every fd-agent may be monitored by K other fd-agents. This helps ensure that fd-agents are continuously monitored which speeds up failure detection. Likewise, the system may handle correlated failures, or any other failures which affect multiple fd-agents. For example, if a rack fails and some of the fd-agents in the rack were only monitored by fd-agents within the rack, failure notifications will not be received for all the failed fd-agents. However, occurrence of the failure may be deduced. Further, the system may handle network partitions of various types.

Controller complexity—some topologies require the controller to work harder to deduce exactly which fd-agents have failed, while other topologies may have a higher probability that a failure notification will be received for every fd-agent.

Number of fd-agents for which the controller must update monitoring-lists—some topologies require graph updates to more fd-agents than other topologies, for example, that use more connections from controller to fd-agents. This may relate the monitoring topology to the graph-propagation topology.

There are many examples of topologies that may be used. In the examples below a datacenter (DC) setting is assumed, where the DC is divided into rooms containing racks of servers. A fault-zone is an entity, such as a rack, a room, etc., which may fail as a unit (correlated failure), for example, due to loss of power or malfunction in a top-of-rack network switch. The devices may include computer systems, network switches, network routers, etc. Such examples may include:

Centralized—a single fd-agent monitors all fd-agents in the system.

K-regular—every fd-agent is monitored by K other fd-agents.

K-regular, physical topology aware—every fd-agent is monitored by K other fd-agents, some of which are in a different fault zone, such as in a different rack, room etc.

K-regular, multi-layer—every device is monitored by K1 machines in the same rack, every rack is monitored by K2 racks in same room, and every room is monitored by K3 rooms. A rack is monitored by monitoring some percentage of the fd-agents in the rack. Similarly for a room. Thus it is possible that not all machines in the rack have failed, but the system can mistakenly deduce that the rack has failed.

Hierarchical—a certain device (or set of devices) in every rack is chosen to monitor all the devices in the rack. Similarly a certain device (or set of devices) in every room is chosen to monitor all the racks in the room. The controller monitors all rooms. This monitoring topology may be a good fit with similar hierarchical failure notification and information propagation topologies.

3D Torus-oriented—for example, a device is directed to monitor the six neighbors of an fd-agent, with two on each side on each of the x, y, and z-axes.

Correlated failures pose a challenge since they may cause all the monitors of an fd-agent to fail at the same time, resulting in the controller not receiving failure notifications for that fd-agent. There are a number of approaches for dealing with such correlated failures. For example, in an embodiment, the failure may be dealt with at the topology level, by essentially computing a topology which avoids the issue (with high probability) Likewise, in an embodiment, more involved logic at the controller may be used.

In an embodiment, correlated failures may be dealt with using topologies that induce explicit failure notification for all fd-agents, even for correlated failures. One desirable property of a monitoring topology is that with high probability the controller will receive notification about a failure of every fd-agent. For example, this may not occur when all the fd-agents monitoring fd-agent X are in the same rack, and that entire rack fails. Embodiments may overcome this issue by defining a topology in which not all monitors for an fd-agent are in the same rack. A similar example may be constructed for a room or other unit of correlated failure (fault zone).

Thus, in order to increase the probability that the controller receives failure notifications for all fd-agents, embodiments may define a monitoring topology that attempts to minimize the probability that all monitors of an fd-agent will fail at the same time. For example, every fd-agent may be monitored by K1 fd-agents in the same rack, K2 fd-agents in the same room but different racks, and K3 fd-agents in different rooms. This way if a rack or room fails, the controller will still receive notification about failures of all fd-agents.

The issue may be defined more abstractly—a correlated failure may be thought of as a partition (a cut) of the monitoring topology graph. For example, between live fd-agents and failed fd-agents. Thus, an edge may be defined between all failed fd-agents and at least one non-failed fd-agent. However, monitoring from a 'far' fd-agent may be subject to more failures and noise, since there are more network hops between the monitor and the monitored fd-agents. Likewise, such monitoring from farther away may be more expensive on the network as compared to monitoring from nearby, as it increases the "link stress" on network elements.

In embodiments, topologies may be defined in which the failure of an fd-agent may be deduced rather than receiving direct notification of the failure. For example, if all the fd-agents monitoring fd-agent A are in the same rack and this rack fails, there will not be a failure notification to the controller about A's failure. If, however, the controller can tell that the rack has failed, then it can deduce that fd-agent A has failed. For example, the controller may define a rack to be down if a percentage of the fd-agents in the rack are down. In this case only that percentage of the fd-agents in the rack needs to be monitored from outside the rack.

Such topologies may require more complexity in the controller. However, there are fewer long-range monitoring links, which may reduce false positives and the load on the network.

In embodiments, topologies may be adapted based on learning and characterizing particular fd-agents, network links etc., and adapting the monitoring topology and associated failure detection parameters accordingly. For example, in embodiments, the frequency of heartbeats sent to a fd-agent may be varied. Examples may include fd-agents that are new or that are known to have failed more frequently may be sent more frequent pings compared to more stable fd-agents. This may provide reduction in the average time to detect a failure using more frequent pings for the same overall cost of pings. In embodiments, the controller may characterize fd-agents propagate such information together with the monitoring topology updates.

In embodiments, the monitoring topology may be varied based on the fd-agent characterization. For example, the number of fd-agents monitoring an fd-agent may be set depending on the 'stability' of the monitored fd-agent. Likewise, more 'stable' fd-agents may be assigned more fd-agents to monitor. In embodiments, network links may be characterized as problematic vs. healthy and to modify the topology and/or keep alive-frequency based on this characterization. For example, if there are persistent false-positives from a specific monitoring relationship, the topology may be changed to avoid this relationship.

In embodiments, the controller may tune parameter given an overview of all monitors of a particular fd-agent. For example, some monitors of an fd-agent may have a lower heartbeat frequency while other monitors of the same fd-agent may be configured with more frequent heartbeats. This may be done based on, for example, overall heartbeats in the system, overall heartbeats on a particular monitor, distance between the monitored fd-agent and the fd-agent to be monitored, etc.

In embodiments, the fd-agents co-located with the controller (i.e. on same machine) are special since there can't be a network failure between them and the controller. As such these fd-agents may hold a special place in the computed monitoring topology.

In embodiments, in order to reduce the probability that an fd-agent is not monitored, it may be possible to increase the number of monitors for that fd-agent. Similarly, if the number of monitors is increased, the controller may be allowed more time before the topology needs to be updated in order to restore the number of monitors to above a desired minimum level. For example, in embodiments, the controller may attempt to maintain the condition that every fd-agent has between K and K/2 monitors. When a monitor of that fd-agent fails there is no immediate need to update and propagate a new monitoring topology. Only once the number of monitors of that fd-agent drops to close to K/2 must a new topology be computed and propagated. Such embodiments allow a type of batching of topology computation and propagation. Typically, there is a tradeoff between the monitoring overheads of having many monitors, and the reduced load on the controller from the ability to delay the topology re-computation and propagation.

In embodiments, the controller may define for each monitoring relation how the monitor should change its list of fd-agents to monitor in the case of a detected failure. This embodiment may also reduce the need for topology updates. For example, assume A monitors B which monitors C. If A detects B has failed, A may immediately start monitoring C. This will help ensure that C continues to be monitored even if B has failed and a new topology has not yet been propagated. In such embodiments the controller may send to the fd-agents additional information beyond the fd-agents to monitor. For example, the controller may send information indicating not only the fd-agents for each fd-agent to monitor, but also information indicating fd-agents to monitor if one of the monitored fd-agents fails. In embodiments, this may be generalized to deal with the failure of C as well, etc.

In embodiments, given a system monitoring according to some topology and a new computed monitoring topology that needs to be deployed, care must be taken when deploying the new topology. For example, consider a system where fd-agent C is currently monitored by fd-agents A and B. A new topology is determined in which A and B no longer monitor C, for example, they may monitor E. If during propagation of the new topology, fd-agents A and B receive their new set of fd-agents to monitor, sets which do not include C, then, at least temporarily, fd-agent C nay not be monitored by any fd-agent.

Embodiments may handle this issue in different ways. For example, the problem can be ignored under the assumption that such windows of time where fd-agents are not monitored are small enough not to matter. Embodiments may allow multiple topologies to co-exist in the system. For example, while a new topology is being propagated, the old one can continue to be monitored. Monitoring according to the old topology is only stopped once the new topology has been deployed. Embodiments may deploy the new monitoring topology in a gradual manner and in a careful order, so as to avoid problematic edge cases.

In embodiments, one or more fd-agents may be monitored by more than one other fd-agent. This is known as multiple monitors per target or fd-agent. More monitors per fd-agent may result in more monitoring messages, increasing the message load in the system. In some embodiments this may be handled by reducing the rate of probe/heartbeat messages sent from each monitor. Multiple monitors per fd-agent may result in more fault tolerance. For example, if a monitor fails, other monitors will still be monitoring the target so a failure of the target will not be missed. This may reduce the urgency with which the controller must propagate an updated topology and may result in reduced controller load. More monitors per fd-agent may reduce detection accuracy, as it may result in a higher probability that at least one fd-agent has an issue causing it to report a false suspicion. A similar issue is more false suspicions due to network issues. On the other hand a false suspicion raised by one monitor may be refuted with help of the other monitors, so overall more monitors per fd-agent may result in more accurate failure detection. More monitors per fd-agent may result in more false suspicions, which may increase the load on the controller due to its involvement in suspicion resolution.

In embodiments, instead of an fd-agent being monitored by K monitors all the time, the K monitors may be divided into groups that are monitored differently. for example, the K monitors may be divided into M monitors, which work all the time, and N monitors, which only come into play to resolve suspicions (M+N=K). In embodiments, only when a failure is suspected by one of the M monitors, does the suspecting monitor contact the additional N monitors causing them to attempt to probe the target, which may result in improved accuracy. In such embodiments, M monitors may be used to achieve fault-tolerance and some accuracy. The additional N monitors may be used to gain additional accuracy. Compared to K monitors continuously monitoring the target, this scheme may reduce the network load.

In embodiments, relations between two fd-agents (point-to-point failure detection) may be monitored. In embodiments, the controller may specify the policy, method and parameters to be used for failure detection between any two particular fd-agents. For example, the specified policy may include fixed heart-beats at frequency X. The policy may be specified based on factors, such as the type of network between the fd-agents (WAN, LAN . . . ), how stable the network is, how stable the fd-agents are, the number of monitors each fd-agent has, etc. In embodiments, the policy decisions may be adapted over time depending on the observed conditions of the fd-agents and the network. The policy decisions may be sent to the fd-agents by the controller as part of the monitoring topology propagation.

Embodiments may utilize any existing or newly developed failure detection methods. Likewise, embodiments may utilize any existing or newly developed transport protocol, such as User Datagram Protocol (UDP), Transmission Control Protocol (TCP), etc. Embodiments may specify whether a monitoring relation between two fd-agents is bi-directional, where fd-agents monitor each other, or is uni-directional, where fd-agent A monitors fd-agent B but B does not monitor A.

Network partitions can occur, making it impossible for some fd-agents to communicate with the controller. Such partitions can later heal. For example, a partition may prevent failure notifications from arriving at the controller and in a scheme where monitors only report failures, a partition may cause controllers to 'think' all fd-agents are operational, indefinitely, which is not acceptable system behavior. Embodiments may handle such occurrences properly.

In embodiments, there may be some monitors that the controller can't be partitioned from, namely the fd-agent(s) running on the same machines the controller itself is running on. The controller may be aware of this and take this into consideration when determining the monitoring topology. Such fd-agents are sure to be able to detect and report failures I network-issues to the controller. For example it is possible to have a monitoring topology which assigns to the controller-local fd-agents at least one fd-agent in every room, or even every rack. Based on the assured detection of these failures it may be possible for the controller to become quickly aware of possible network partitions. The controller would need to then determine if the detected failure is due to a network partition or a failed fd-agent.

For example, assume a monitoring topology whereby the controller-local fd-agent monitors K fd-agents in every room. In addition, every room has at least some fd-agents in it monitored by fd-agents external to the room and not on the controller. Further, assume the controller-local fd-agents have notified the controller of a failure in monitoring of all K fd-agents in some room. The controller may differentiate between 1) the entire room has failed, 2) the K fd-agents the controller is monitoring in the room have failed, 3) there is a network partition between the controller and the room, and 4) there is a network partition of controller from most or all other fd-agents and/or rooms. Further, the controller may differentiate between combinations of these conditions.

In embodiments, the controller may handle these conditions and combinations of conditions by, for example, correlating the failures detected by the controller-local fd-agents with received and/or un-received failure notifications about the fd-agent from others. If the controller detects a failure, but has recently received other failure notifications from within the room then it may then determine that it is dealing with fd-agent failures (case 2 above). If the controller did not receive any other failure notifications from within the room then the options are either the entire room failed (case 1 above) or there is a network partition of the controller and all the monitors of the room that are outside the room (case 3 or 4 above). In the case in which the entire room failed, assuming the monitoring topology had the room monitored from fd-agents in other rooms (and not just the controller itself), then the controller should receive failure notification from the other monitors.

In embodiments, instead of basing all decisions on a static monitoring topology, the controller may change the topology in reaction to such failure notifications. For example, the controller may expand the list of fd-agents monitored by its local fd-agents based on suspected partitions. Thus the controller may become aware of more inaccessible fd-agents and of the extent of any partition the controller may be part of.

Network issues, such as partitions, may cause the controller to not receive failure notifications. In embodiments, fd-agents may, in addition to sending notification of failures, send periodic 'keep-alive' messages to the controller. If the controller does not receive these messages from fd-agents, the controller may determine that a network issue may be occurring. In embodiments, the keep-alive frequency may be set at some relatively low rate so as not to impose too much load on the controller. The frequency of the keep-alive messages may be set by the controller and may be adapted over time. The controller may vary this rate according to factors such as the overall number of fd-agents in the system and how much load the controller is able or willing to sustain. The controller may also define different keep-alive frequencies based on other metrics, such as the remote fd-agent load, fd-agent distance from the controller etc.

In embodiments, similar to the monitoring topology, the topology that the keep-alive messages are sent over may be defined by the controller. In embodiments, the keep-alive messages may be sent directly from fd-agents to the controller. In embodiments, other topologies may be utilized. For example, the topology may contain redundancy so as to help ensure the keep-alive message arrives even if some fd-agents on the path have failed. In addition, the keep-alive messages may be aggregated. For example, a single keep-alive message may be sent for an entire rack, representing the fact that all machines in the rack are operational.

In embodiments, when a monitor suspects an fd-agent failure, the mechanism by which such suspicions are either refuted are accepted as failures may be defined. For example, fd-agents may first be declared as suspected and not immediately declared as failed in order to minimize the occurrence of false positives. False positives can occur due to, for example. a network issue between one specific monitor and the target fd-agent, or due to other problems on the either the monitor or monitored side.

Embodiments may utilize techniques for suspicion resolution. For example, a controller-based resolution-sliding time-window heuristic may be utilized. In this technique, a controller may determine that an fd-agent N has failed based on the notifications the controller received for the fd-agent in the last Y seconds from the relevant monitors. For example, if X out of K of an fd-agent's monitors have reported N as having failed in the last Y seconds, then the fd-agent is deemed non-operational.

As an example of a false positive scenario, an fd-agent X may be monitored by fd-agents n1, n2, and n3. X fails and this is detected only by fd-agent n1. X recovers and then fails again and this is detected only by fd-agent n2. X recovers yet again and then fails again and this is detected by only by fd-agent n3. It now recovers. The end result is that the controller has seen 3 failures reported in the last Y seconds, although the fd-agent is operational. This is an example of a false positive.

Other examples of issues include whether the controller is to receive notifications about failures only, or about any status change, such as a failed fd-agent now being operational. For example, if the controller is partitioned from the monitors, and cannot receive inputs from the monitors about an fd-agent for which it recently received failure notifications, then if the fd-agent becomes operational, how will the controller become aware of this? Another exemplary issue is that the controller may not be able to put the notifications it received from different monitors into order. Embodiments may handles this using the versioning-schemes described below. Further, if the failure-notification topology has all monitors of fd-agent X sending notifications to one or more fd-agents instead of to the controller, then one or more of the fd-agents may perform the suspicion resolution.

In embodiments, controller-based resolution with a second opinion may be utilized. For example, upon receipt of a suspicion for fd-agent X, the controller may initiate a request to some or all monitors of fd-agent X. On receipt of this request, the monitors may attempt to connect to X and then will report on the result. If any monitor can communicate with X, then the controller 'knows' that X has not really failed. This approach may increase the load on the controller, the time to detection of failures may increase since now the monitors perform a second detection, and the controller needs network connectivity with the fd-agents providing the monitoring.

In embodiments, if the heartbeats are versioned, then when the controller contacts the monitors, they can tell the controller the last version for which they saw the fd-agent as operational. The controller may compare these received versions to the version that the suspicion arrived with. If the versions the monitors have seen are more recent than the version of the suspicion, then the suspicion may be cancelled or ignored. If the version is older than the version of the suspicion, then the monitor fd-agents may try to communicate with the suspected fd-agent, and report the result to the controller.

In embodiments, monitor-based resolution may be utilized. For example, when a monitor suspects an fd-agent X, the monitor may propagate this suspicion to the other fd-agents monitoring X. These monitors may in turn attempt to propagate the suspicion to X itself. If X receives a suspicion, it may refute it. The monitor receiving the refutation may then propagate the refutation to the other monitors. There may be a monotonically increasing counter on fd-agent X. This counter may increase at least every time X receives a suspicion, but may also be increased, for example, every time X receives a ping from any monitor. Further, every monitor of X may know about all the other monitors of X, and may communicate with them. If every fd-agent is monitored by K monitors, this means every monitor may communicate with $K^2$ fd-agents. Likewise, when the topology is updated, the controller may communicate the change to many more fd-agents. This may result in more complexity in the fd-agents, topology updates may be sent to many more fd-agents and each fd-agent may potentially communicate with many more fd-agents, the time to detection may be similar to the controller-based second opinion technique, and the load on the controller may be reduced.

In embodiments, for each target, one or more of the monitors may be designated to be a suspicion resolver. When a failure is suspected, the suspecting monitor may inform the suspicion resolver rather than the controller. The suspicion resolver may attempt to perform the resolution and inform the controller once a suspicion is confirmed or denied.

In embodiments, each fd-agent may maintain a version number that is monotonically increasing. The 'version number' may be thought of as a logical counter or sequence number. Use of the sequence number may enable comparing the 'time' of two monitoring probes from two different monitors to the same target fd-agent. For example, fd-agents A and B may monitor fd-agent C. In order to compare the results of two monitoring probes of C, one from A and one from B, and determine which probe occurred later, the sequence number may be maintained on every fd-agent, and may be returned to the monitors as part of the results sent to them. In embodiments, if clocks are synchronized between all monitors, to within some precision, then in some embodiments, ordering between different monitoring probes may be determined using a timestamp instead of using a version number.

In embodiments, the version information may include information relating to what may be termed the fd-agent epoch. For example, the most-significant bits, least-significant bits, or other portions of the version information may include the fd-agent epoch. The fd-agent epoch may be increased on every startup of an fd-agent. If there is no persistent storage on the agent, the controller may maintain this number for the fd-agents, which may receive it on startup when they register with the controller. For example, an fd-agent's version may be formatted as the pair <epoch: counter>.

In embodiments, the fd-agent may increase a counter on receipt of every heartbeat from any monitor. In embodiments, the fd-agent may maintain a counter which it increases on receipt of a suspicion.

In embodiments, if a monitored fd-agent detects that its monitor has not contacted it within a timeout, or if bi-directional monitoring is used, the monitored fd-agent may start a suspicion refutation process itself rather than wait for this to be initiated by its peers. This may be done by indicating the start of the process to the other monitors that the monitored fd-agent does have access to. In addition, the monitored fd-agent may inform the controller that it is operational. By doing this, cases in which the controller would have to contact the fd-agent (or its monitors) because it received a failure notification about it may be avoided. Rather, the suspicion would be refuted by just having the controller examine the sequence of received notifications and the sequence-numbers in those notifications.

For example, a monitor may notify the controller of a failure due to a network issue preventing it from communicating with some target. Soon afterwards, the target fd-agent may notice that the monitor has not contacted it and will decide to raise its local sequence number and inform the controller that it is operational.

In embodiments, the controller, which may be considered to be a logical entity, may be implemented in a number of ways. In embodiments, the controller may maintain or replicate the state of the system, while in other embodiments the state of the system may be stored externally to the controller. In embodiments, the state may be defined to be strongly-consistent across all controller instances, while in other embodiments the state may be defined to be more weakly consistent, such as eventually consistent? In embodiments, the state and/or the controller may be global, while in other embodiments the state and/or the controller may be partitioned.

In embodiments, the state of the controller may be stored externally, in a coordination system that also may function as a highly-available and strongly-consistent data store. Examples of such systems are GOOGLE CHUBBY™, APACHE ZOOKEEPER™, etc. In embodiments, the state may global and the controller is not partitioned. Multiple controller instances may run for fault tolerance, but only a single controller may be designated as leader at any time. Only the leader performs operations such as topology updates, etc. The leader may be chosen with the help of the coordination system. For example, if the coordination system is APACHE ZOOKEEPER™, then a leader election recipe may be used. In order to ensure only a single leader is active even in split-brain scenarios, we define that a lease must be held by the leader. Thus a controller will only take any actions as leader if it holds a valid lease. Only once the lease expires will an alternative leader be allowed to take over from a failed leader. Note this assumes some bounded clock skew between controller fd-agents. FD-Agents that contact a non-leader controller fd-agent will be redirected to the leader.

In embodiments, lower-consistency schemes for controller high availability may be utilized, and may have advantages such as enhanced availability etc. In addition, the controller might be shared for scalability/availability.

In embodiments, the architecture may accommodate monitoring resources to which an fd-agent can't be deployed. Such entities will be leaf fd-agents of the monitoring topology since they will not themselves be active monitors. For example each fd-agent deployed to a server can monitor any number of arbitrary local processes for health. If a failure is detected, the monitor can report this to the controller as it would for any other failure. Various different approaches to monitoring such external entities can be accommodated, such as hitting a health-URL, etc.

Figure 3:
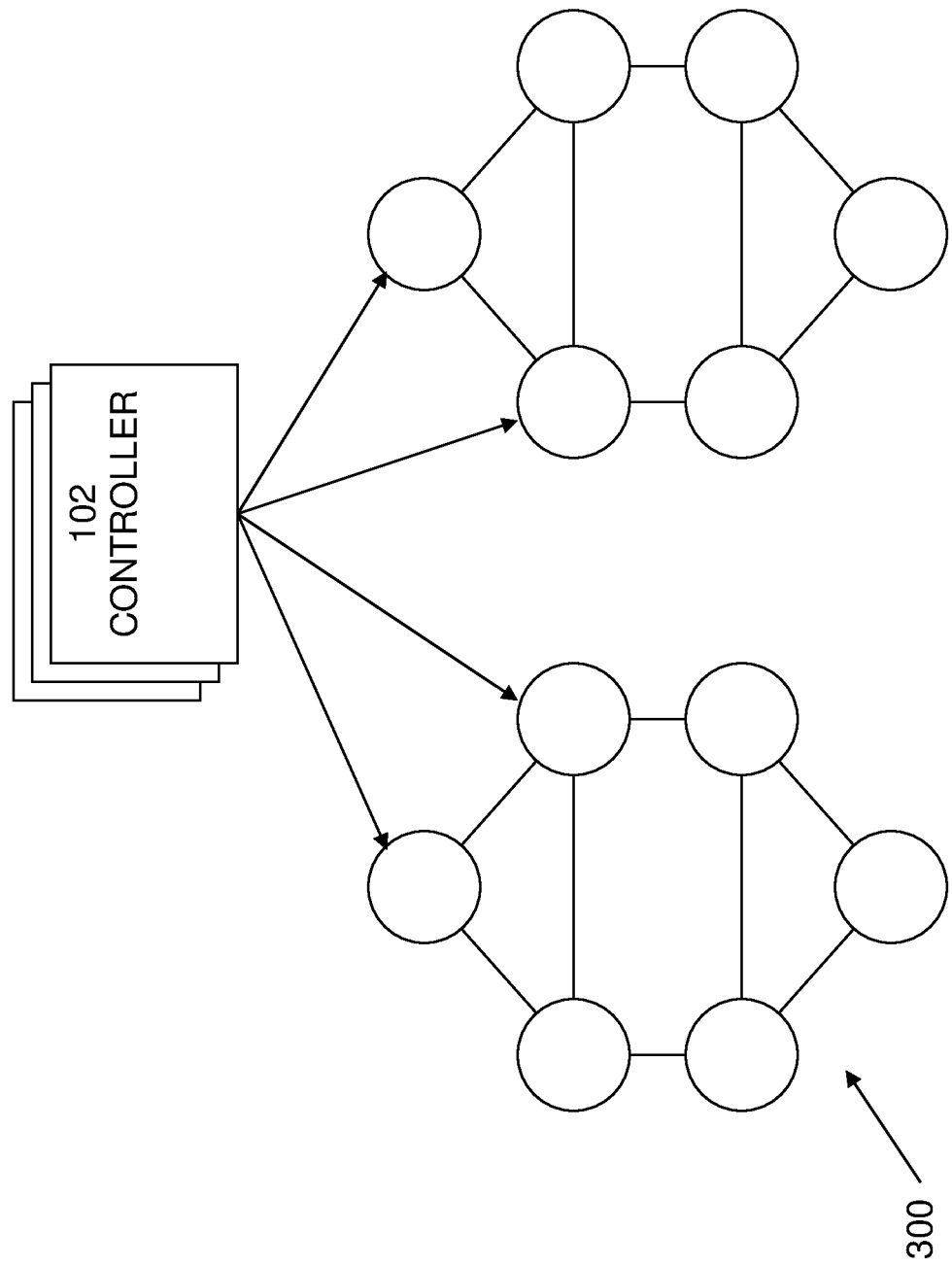
FIG. 3 illustrates an exemplary diagram of a monitoring topology.
Figure 4:
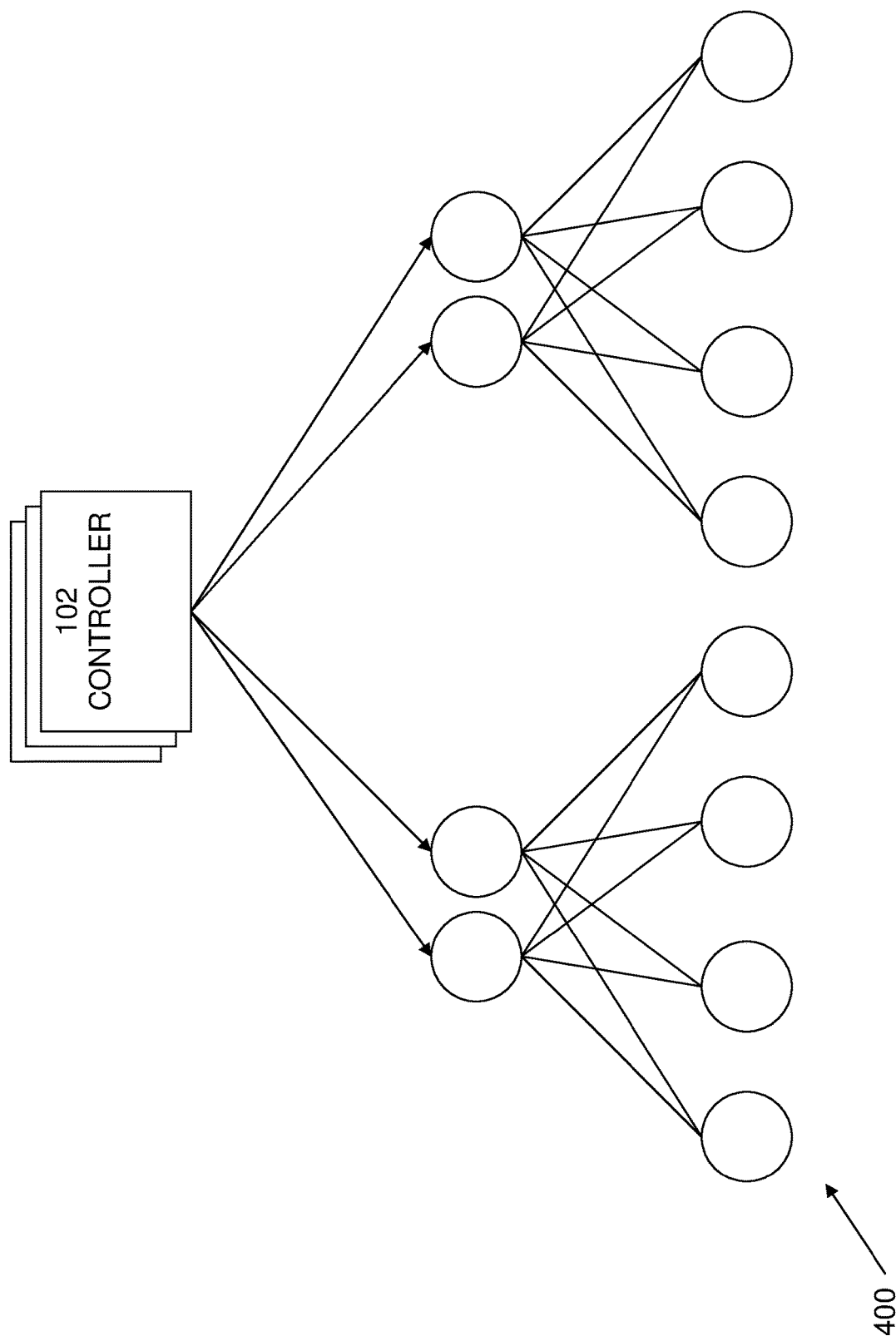
FIG. 4 illustrates an exemplary diagram of a monitoring topology.

An example of a monitoring topology 300 is shown in FIG. 3. In this example, a 3-regular monitoring topology, such as may be used within racks of equipment is shown. An example of a monitoring topology 400 is shown in FIG. 4. In this example, a hierarchical monitoring topology is shown. It is to be noted that the present techniques are applicable to any type or arrangement of monitoring topology, failure notification topology, or information propagation topology.

Figure 5:
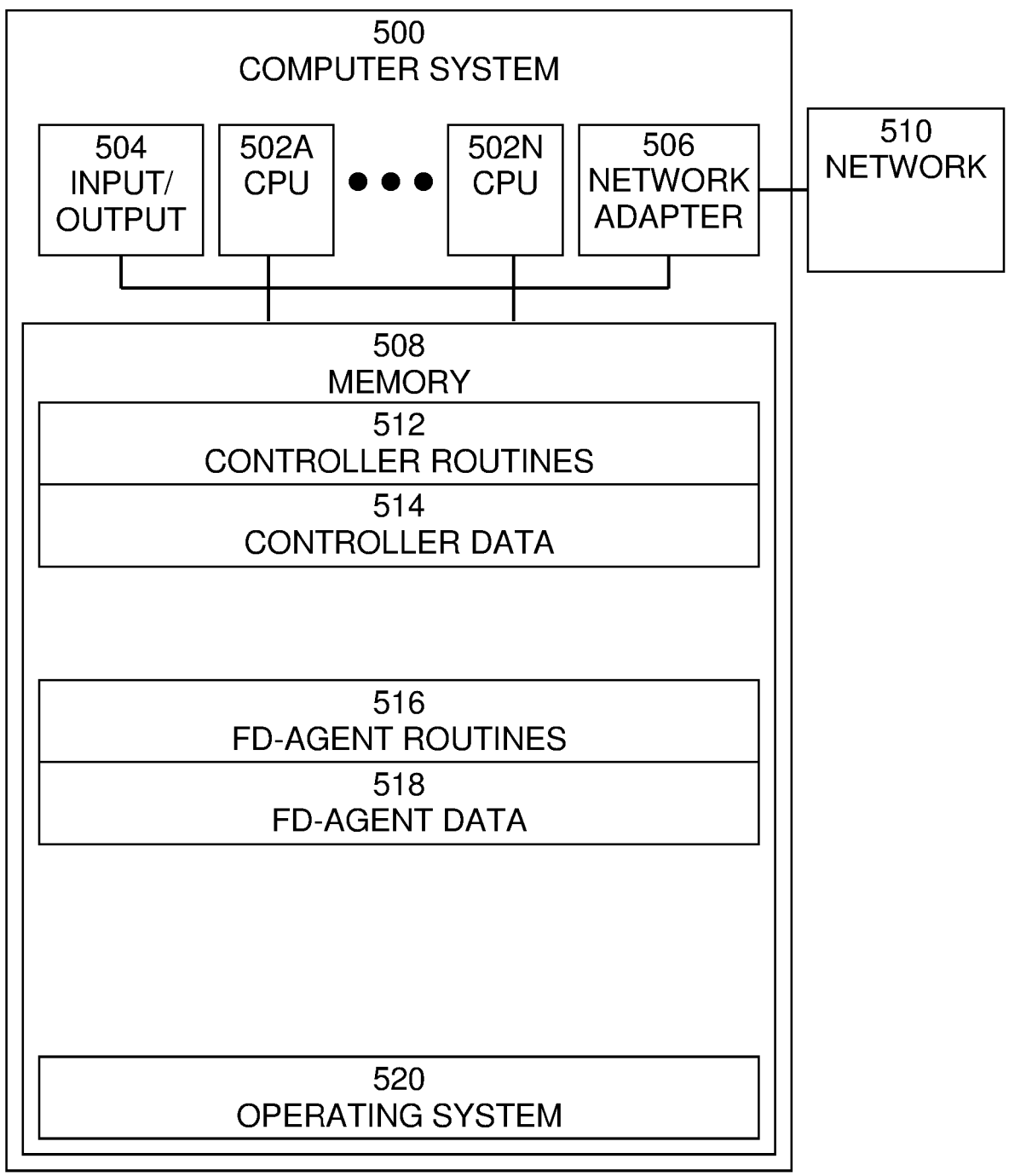
FIG. 5 is an exemplary block diagram of a computer system in which processes involved in the embodiments described herein may be implemented.

An exemplary block diagram of a computer system 500, in which entities and processes involved in the embodiments described herein may be implemented, is shown in FIG. 5. As described above, one or more controllers may be implemented on one or more computer systems, and one or more fd-agents may be implemented on one or more computer systems. In the example shown in FIG. 5, for simplicity, both controller software and fd-agent software are shown in computer system 500. One of ordinary skill in the art would recognize that any computer system may include zero, one, or more controllers and may include zero, one, or more fd-agents. Accordingly, the illustration of a computer system including a controller and an fd-agent is merely an example. The present invention is applicable to any arrangement of controllers, fd-agents, and computer systems.

Computer system 500 may typically be implemented using one or more programmed general-purpose computer systems, such as embedded processors, systems on a chip, personal computers, workstations, server systems, and minicomputers or mainframe computers, or in distributed, networked computing environments. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor.

FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include controller routines 512, controller data 514, fd-agent routines 516, fd-agent data 518, and operating system 512. Controller routines 512 may include software routines to perform processing to implement one or more controllers as described above. Controller data 514 may include data needed by controller routines 512 to perform processing to implement one or more controllers as described above. Fd-agent routines 516 may include software routines to perform processing to implement one or more fd-agents as described above. Fd-agent data 518 may include data needed by fd-agent routines 516 to perform processing to implement one or more fd-agents as described above. Operating system 520 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A computer-implemented method for monitoring and detecting failure of electronic systems comprising:
   in a system comprising a plurality of networked computer systems, defining a plurality of failure detection agents to monitor operation of other failure detection agents running on at least some of the electronic systems;
   defining, at a controller, and transmitting, from the controller, topology information defining a topology of the failure detection agents to the failure detection agents; and
   wherein the topology information includes a first topology information defining which failure detection agents each failure detection agent is to monitor, a second topology information defining which failure detection agents each failure detection agent is to notify when a failure is detected or suspected, and a third topology information defining a topology for propagating instructions to the failure detection agents, and wherein the first topology information, the second topology information, and the third topology information are independent of each other.

2. The method of claim 1, wherein each failure detection agent is configured to communicate failure information to at least a controller, to at least one other failure detection agent, or both.

3. The method of claim 2, wherein the topology information further includes information defining which failure detection agents each failure detection agent is to notify when a failure is detected or suspected.

4. The method of claim 3, wherein the topology information further includes information defining the topology information that is to be propagated to the failure detection agents.

5. The method of claim 3, wherein the controller is configured to:
receive a notification of a suspicion of a failure, and
resolve the suspicion of the failure to determine whether to refute or accept the suspicion of the failure.

6. The method of claim 3, wherein at least one failure detection agent is configured to:
receive a notification of a suspicion of a failure, and
resolve the suspicion of the failure to determine whether to refute or accept the suspicion of the failure.

7. The method of claim 1, further comprising:
modifying, at the controller, the topology information based on changes in conditions notified to the controller from at least one failure detection agent during operation of the electronic systems.

8. A system for monitoring and detecting failure of electronic systems comprising:
at least one controller, implemented in a computer system comprising a processor, memory accessible by the processor, and computer program instructions stored in the memory and executable by the processor, the controller configured to define and transmit, to a plurality of failure detection agents, topology information defining a topology of the failure detection agents, wherein the topology information includes a first topology information defining which failure detection agents each failure detection agent is to monitor, a second topology information defining which failure detection agents each failure detection agent is to notify when a failure is detected or suspected, and a third topology information defining a topology for propagating instructions to the failure detection agents, and wherein the first topology information, the second topology information, and the third topology information are independent of each other; and
a plurality of failure detection agents, each failure detection agent implemented in a computer system comprising a processor, memory accessible by the processor, and computer program instructions stored in the memory and executable by the processor, each failure detection agent configured to receive the topology information from the at least one controller and to monitor operation of other failure detection agents based on the received the topology information.

9. The system of claim 8, wherein each failure detection agent is further configured to communicate failure information to at least one controller, to at least one other failure detection agent, or both.

10. The system of claim 9, wherein the topology information further includes information defining which failure detection agents each failure detection agent is to notify when a failure is detected or suspected.

11. The system of claim 10, wherein the topology information further includes information defining the topology information that is to be propagated to the failure detection agents.

12. The system of claim 10, wherein at least one controller is further configured to:
receive a notification of a suspicion of a failure, and
resolve the suspicion of the failure to determine whether to refute or accept the suspicion of the failure.

13. The system of claim 10, wherein at least one failure detection agent is further configured to:
receive a notification of a suspicion of a failure, and
resolve the suspicion of the failure to determine whether to refute or accept the suspicion of the failure.

14. The system of claim 8, wherein the controller may be further configured to modify the topology information based on changes in conditions notified to the controller from at least one failure detection agent during operation of the electronic systems.

15. A computer program product for monitoring and detecting failure of electronic systems, the computer program product comprising a non-transitory computer readable storage having program instructions embodied therewith, the program instructions executable by a computer, to cause the computer to perform a method comprising:
in a system comprising a plurality of networked computer systems, defining a plurality of failure detection agents to monitor operation of other failure detection agents running on at least some of the electronic systems; and
defining, at a controller, and transmitting, from the controller, topology information defining a topology of the failure detection agents to the failure detection agents;
wherein the topology information includes a first topology information defining which failure detection agents each failure detection agent is to monitor, a second topology information defining which failure detection agents each failure detection agent is to notify when a failure is detected or suspected, and a third topology information defining a topology for propagating instructions to the failure detection agents, and wherein the first topology information, the second topology information, and the third topology information are independent of each other.

16. The computer program product of claim 15, wherein each failure detection agent is configured to communicate failure information to at least a controller, to at least one other failure detection agent, or both.

17. The computer program product of claim 16, wherein the topology information further includes information defining which failure detection agents each failure detection agent is to notify when a failure is detected or suspected.

18. The computer program product of claim 17, wherein the topology information further includes information defining the topology information that is to be propagated to the failure detection agents.

19. The computer program product of claim 17, wherein at least one of the controller or at least one failure detection agent is configured to:
receive a notification of a suspicion of a failure, and
resolve the suspicion of the failure to determine whether to refute or accept the suspicion of the failure.

20. The computer program product of claim 15, further comprising:
modifying, at the controller, the topology information based on changes in conditions notified to the controller from at least one failure detection agent during operation of the electronic systems.

* * * * *